United States Patent [19]

Koo

[11] Patent Number: 5,389,702

[45] Date of Patent: Feb. 14, 1995

[54] SOIL HARDENING MORTAR AND METHOD FOR MAKING THE SAME

[76] Inventor: Chul-Way Koo, #348-2, Sungbuk-Dong, Sungbuk-Ku, Seoul, Rep. of Korea

[21] Appl. No.: 846,253

[22] Filed: Feb. 27, 1992

[30] Foreign Application Priority Data

Mar. 7, 1991 [KR] Rep. of Korea .............................. 3681

[51] Int. Cl.$^6$ ........................ C09K 17/00; C08K 5/09; C08K 3/32; C08K 3/34
[52] U.S. Cl. ........................ 523/132; 524/400; 524/417; 524/435; 524/443; 524/72; 106/633; 106/634; 106/718; 106/719
[58] Field of Search ..................... 523/130, 131, 132; 524/400, 417, 435, 443, 72; 106/633, 718, 719, 634

[56] References Cited

U.S. PATENT DOCUMENTS

| | | | |
|---|---|---|---|
| 2,702,965 | 3/1955 | Boyd | 523/132 |
| 2,765,290 | 10/1956 | Ziegler | 523/132 |
| 4,607,066 | 8/1986 | Barry et al. | 523/130 |
| 5,006,176 | 4/1991 | Oka | 106/633 |

*Primary Examiner*—Peter Szekely

[57] ABSTRACT

A soil hardening method is for stabilizing soil through the process of drying and grinding the soil, and applying a first agent and a second agent to the soil until the agents are uniformly infiltrated between soil particles to improve hardening, water proofing and stabilization of the soil. The soil mortar can be applied for all types of the soil including silt, clay, and sand, and soil with high moisture content. The soil mortar is economical due to its short working times, and in addition it has uniform curing and is waterproof.

72 Claims, No Drawings

SOIL HARDENING MORTAR AND METHOD FOR MAKING THE SAME

BACKGROUND

The present invention relates to soil hardening which stabilizes desired soil for civil engineering works, and a method for making the soil hardening mortar. More particularly the invention pertains to soil hardening, water proofing, and stabilization of a variety of soils including silt, clay, and sand which were once thought to be most difficult to treat due in part to their high moisture content.

The conventional method for soil stabilization which involves pressing jobsite soil with reinforcing materials such as gravel, sand, clay, cement, and the like has many disadvantages. There is little water proofing, and cracking occurs because the soil particles are mixed in their original state. Frost damage is heavy during the winter season and accordingly, there are drawbacks which often result in constant repairs of the road. In particular, for difficult to treat soils like soils having above 20% clay content, soils having sand, organic soil and clay, which have moisture contents in the range of 20% to 35% or strong colloids containing much moisture, there are no currently available practical methods for the preparation of these types of soil for civil engineering works. Further, clay soils are particularly difficult to treat due to their spongy states.

SUMMARY OF THE INVENTION

The present invention overcomes much of the drawbacks of prior methods, and provides for a fast and easy method to stabilize soil through a step by step process involving drying, grinding and mixing of the jobsite soil so as to uniformly infiltrate a first agent and a second agent between soil particles in order to improve hardening, water proofing and stabilization by using an easily transportable apparatus for each step. This method can be used to prepare soil mortar to stabilize difficult to treat soils having colloidal states such as clay, fine silt, and sand. The apparatus used in each step is designed to be easily connected on the jobsite to provide strong mixing, moisture control and compound ratio setting so as to disperse the first agent and second agent within the soil particles, and prepare the soil hardening mortar through efficient mechanical means. This provides soil mortar on the jobsite to prepare a base stabilized with the first agent and second agent mixed uniformly. That is, as in the conventional remicon (ready mixed concrete, mixing sand, cement and the like), the invention prepares and supplies stabilized soil mortar systematically and quickly.

DESCRIPTION OF THE PREFERRED EMBODIMENT

There follows a detailed description of the invention:

The term, "transportable removable apparatus for drying, grinding and mixing" according to the present invention refers to a series of apparatus for civil engineering works. The three separate steps involved in the preparation of soil hardening mortar are achieved through these separate apparatus: for step 1, a soil drying apparatus for drying; for step 2, a soil grinding apparatus for grinding; and for step 3, a soil mixing apparatus for mixing. The above apparatus from the 1st to 3rd step are operated in connection with motor vehicles on the jobsite and are separable and moved easily.

The method for making soil hardening mortar and the soil mortar prepared by the method are described in greater detail according to each step.

Step 1: Drying Treatment

One needs to measure the soil moisture content of the jobsite soil for civil engineering works. The jobsite soils that are in the temperature range of 5° C. to 35° C., are naturally dried to reduce their moisture content without any treatment to their desired range of 10% to 12%.

Should it require, the soil is placed into the mixing apparatus connected to a power source and rotated to control the natural moisture content of the soil to within the above mentioned range of 10% to 12%.

In case the soil has a moisture content slightly above the desired range, one could avoid the drying process by controlling the moisture content of the first agent and second agent that will later be mixed with the soil.

Step 2: Grinding Treatment

The treated moisture controlled soil of Step 1 is transferred into the grinding apparatus for Step 2 consisting of a hammer crusher and screw device and crushed in the range of 5 to 15 mm.

Step 3: Mixing Treatment

The crushed soil transferred from the Step 2 is placed and mixed in the mixing apparatus together with the first agent and second agent. The first agent and second agents are pumped into the mixer from their separate storage tanks in a ratio of 1:1 by weight. At this time, the soil, first agent and second agent are mixed by the mixing apparatus having a strong mixing force of 3 to 4 times that used for conventional remicon applications.

The above first agent is stored in a single tank and injected into the mixing apparatus through an injection tube, and the above second agent is stored in two separate storage tanks comprising a second agent subgroup A storage tank containing phosphoric acid and a second agent subgroup B storage tank containing the rest of the materials for the second agent, each with its own separate injection tubes.

The second agent is placed into the mixing apparatus by transferring equal amounts of liquid through the injection tube for the phosphoric acid and the injection tube for second agent subgroup B (comprising sodium fluosilicate, ferric chloride, and lignin sodium sulfonate).

The soil mortar uniformly mixed through the above three steps are transferred into the storage silo and transported to the jobsite by transporting vehicles.

The soil hardening mortar prepared by the course of drying, grinding and mixing through the transportable removable apparatus does not require cement, and with only a mixture of this revolutionary first agent and second agent, the soil is thoroughly mixed to achieve waterproofing, distribution, sedimentation, and hardening stabilization all together in one swift and economical process.

In the above steps, the first agent can be polyacrylic acid or polyvinyl acetate or polyacrylamide, or a mixture of any two or more; or a copolymer of acrylic acid with vinyl acetate or copolymer of vinyl acetate with acrylamide or copolymer of acrylic acid with acrylamide, or a mixture of the above; or a mixture of two or more of the above polymers and copolymers. The first agent also comprises of magnesium stearate and water soluble phenol resin.

When the soil hardening mortar is prepared in a high temperature zone (above 35° C.), the above magnesium stearate reacts with water soluble phenol resin and the magnesium and calcium contained in the soil on the jobsite to bring about significant improvements in the physical properties of the soil hardening mortar. Accordingly, when the soil mortar is used at high temperatures (above 35° C.), the above magnesium stearate and water soluble phenol resin are only needed in small quantities as additional agents and at times not used at all depending upon conditions.

The above second agent has a composition comprising of the following: 0.8–1.0 wt % sodium fluosilicate ($Na_2SiF_6$), 0.1–1.5 wt % ferric chloride ($FeCl_3 \cdot 6H_2O$), 0.8–1.1 wt % lignin sodium sulfonate and 3.0–3.3 wt % phosphoric acid, with the materials present in a ratio of 1.2:2.5:2.0:4.3 by weight.

When the phosphoric acid in the composition of the second agent is mixed on the jobsite with sodium fluosilicate, ferric chloride, and lignin sodium sulfonate a gel reaction takes place. The above first agent and second agent are placed into the mixing apparatus through the mixing step and thoroughly mixed by a strong mixing force. The mixing ratio for the first agent and second agent is preferably 1:1 as a ratio by weight when the natural soil moisture content is 10% to 12%, and the mixing amount for the first agent and second agent is preferably 6.7–9.0 wt % based on the treated soil.

According to the moisture content of the soil, the moisture content of the soil hardening agents (i.e. the composition of the first agent and second agent) can be reduced. Some further moisture control is needed according to the distribution and sedimentation reaction in the soil. The resulting soil mortar should preferably attain an optimum moisture content of 15% to 18%.

This mortar is immediately transferred to the jobsite and finished by pressing. In order to thoroughly achieve soil hardening and stabilization after working, one should avoid the effects of below 0° C. temperature and excess moisture from prolonged rainy seasons.

Under temperatures of 15° C. to 35° C., when working with the soil mortar which is prepared by injecting the first agent and the second agent on the treated soil of the jobsite, the work of laying the soil in its place and pressing should be finished within 60 minutes of mixing, as the gel reaction on the first agent and second agent slowly gets started. For up to one hour, the chemical reaction is slowly formed. The soil hardening agents are chemically composed such that after about 2 hours, there is a sudden increase in chemical reaction resulting in the hardening of soil, and after 3 to 5 hours, it achieves a hardened state which allows passage of vehicles over the surface.

In the treatment of the poor subsoil (a ground layer comprising many unstable layers of soil), the soil is dug out from a base hole bored by a drill for civil engineering works, and the soil hardening mortar is prepared by treating the soil according to the method described above and mixed with the first agent and second agent. The mortar is then used to refill the base hole and pressed to be hardened.

Meanwhile, the lignin sodium sulfonate, as a constituent of a second agent of the present invention, acts to reinforce absorbency, sedimentation, distribution, and aggregation qualities of fine soil particles, and the magnesium stearate reacts within a specified time frame to suddenly increase the binding strength for solidification. The magnesium stearate when treated in a high temperature zone (35° C.) reacts with the water soluble phenol resin to greatly improve the physical properties of hardening.

The phosphoric acid and ferric chloride help facilitate complete distribution, drying, sedimentation and solidification by hardening. The sodium fluosilicate increases the rate of hardening and heightens the effects of hardening and solidification.

The first agent, second agent and soil mixture utilizes mutually induced bridge formation and colloidal formation, and by means of mechanical mixing, it achieves a complete and thorough distribution of all particles to prepare the soil hardening mortar.

In the method for making the soil mortar, the desired optimum moisture content for the soil mortar prepared by mixing the first agent and the second agent with the naturally moisture controlled soil is between 15% and 18%. The thoroughly mixed soil hardening mortar can be applied to the treated road and thoroughly passed by the treating apparatus for civil engineering works, without worries of the apparatus being stuck, if applied on the jobsite at average temperatures of 25° C. The soil mortar has a quality that allows a fast pace in work progress.

In addition, due to the mortar's special characteristics of high dryness, low shrinkage and water proofing, it is suited for the prevention of water related damage. These qualities of the soil hardening mortar allow it to be easily used for solidification of the soil having fine particles of below 0.001 mm such as organic clay.

The soil hardening mortar can be applied from 5° C. to 35° C. and the use of the soil mortar should be considered below 5° C. One of the key advantages of the current invention is that at temperatures above 5° C. it can be used for any type of soil.

Further, in the case of high moisture content soil, at jobsites having temperatures of 25° C. to 35° C. during the dry season, the evaporation effect is good and thus moisture control should be done during soil preparation and through moisture control of the first agent and the second agent in order to achieve the ideal moisture content.

In addition, during the mixing step, distribution, sedimentation, and water repelling takes place which should aid in achieving the ideal natural moisture content of the soil in the treated step to a controlled level of about 10% to 12%.

For example, in the region near the equator with temperatures of 25° C. to 35° C. during the 6 months of dry season, through the dual effects of utilizing moisture reduction by natural evaporation and by distribution, sedimentation, and water repelling on mixing compositions of the first agent and the second agent, the optimum moisture content of soil mortar can be kept in the range of 15% to 18%.

In temperate zones having a temperature of 5° C. to 35° C., the soil mortar can be applied to any type of soil.

The water soluble phenol resin and magnesium stearate as a first agent are added in small amounts as an additional agent and to improve the physical properties of the treated road when applied in high temperature zones (above 35° C.).

The present invention will be described in greater detail with reference to examples and experimental examples.

Experimental Example 1

As shown in Table 1 below, soil samples, A, C, D, F, G, H (Japanese soil) and loess (or Chinese yellow soil obtained in Korea) are taken respectively and their moisture contents are controlled to 10%.

The first agent comprises the following: 81 wt % copolymer of acrylic resin and vinyl acetate resin, 3 wt % magnesium stearate, 7 wt % water soluble phenol resin (moisture content 30% to 50%, PH 8-10), and 9 wt % polyacrylamide.

The first agent and the second agent mixing ratio by weight is kept at 1:1. 800 g of each soil which are passed through 4 mm mesh sieving, 29 g of first agent and 26 g of second agent (14 g of 50% phosphoric acid and 12 g of a material composed of sodium fluosilicate, ferric chloride, lignin sodium sulfonate in a ratio by weight of 1.2:2.5:2.0) are placed into the mixing apparatus and stirred at 500 to 1000 RPM to produce the soil mortars. The resulting soil mortars are placed in a K. S. (Korean Standard) designated mold plate for civil engineering experiments (10 cm×7 cm) (designed for compaction and application of 4.5 Kg pressure in vibration) and the plate is compacted 30 times (100 to 135 Kg/cm$^2$). From the time of releasing the molded soil sample from the plate, quick-setting, gel-stabilization, water repelling and drying processes all start to take place simultaneously.

The compressed, broken strength for the resulting molded soil samples are measured by an experimental instrument (Universal Testing Machine RH-10TV, Manufactured by Shimatsu Works, Japan).

The measured values are shown in Table 1 below.

TABLE 1

| Sample | Compress, broken strength (kg) | Average compressed, broken strength (kg/cm$^2$) |
|---|---|---|
| A: lean clay 3/2 + sand 1/3 | 1.325 | 113.08 |
| C: clay 4/5 + sand 1/5 | 100 | 10.36 |
| D: clay 2/3 + sand 1/3 | 232 | 17.71 |
| F: loess 1/2 + sand 1/2 | 665 | 52.73 |
| G: clay 3/4 + sand 1/4 | 114 | 9.35 |
| H: clay 2/3 + sand 1/3 | 392 | 33.92 |
| Loess (Korea) | 540 | 39.82 |

(Optimum Moisture Content: 17.3%

As shown in Table 1, the compressed broken strength for the molded soil samples are ranked as follows starting with the strongest:

A>F>loess>H>D>C>G

The current experiment indicates that the compressed, broken strength for the soil increases with the pressing strength applied at the jobsite; and that the balanced compression strength is achieved through uniformly mixing soil particles by means of mechanical pressing after drying, grinding, and strong mixing of the soil. More balanced soil hardening mortars were produced in this experiment than those achieved by simply pressing the soil after spreading the fluids by the spreader on the jobsite soil. The resulting compressed broken strength is about two times stronger.

In addition, the current invention can be applied to the treatment of silt, clay and organic soil having soil particle size below 0.001 mm and soil types which are not treatable with conventional soil cement nor conventional concrete methods.

Example 1

A section of a dirt road of size 1 m×1 m×20 cm is dug out. The resulting north continental soil (with natural moisture content of 35%, deemed as one of the most difficult to treat soils) comprises 30% clay, 30% organic matter soil, 20% silt of below 0.001 mm particle size, 10% sand and 10% loess. The soil is dried for 7 hours at 20° C. on a clear day and its moisture content reduced by 10%.

The resulting soil is re-dried in an oven of 5 Kg-volume capacity. The soil is dried until the natural moisture content measuring device indicated a 12% level. The soil is then ground by the grinding apparatus and then sieved by 5 mm mesh sieving. 14 Kg of first agent as comprised in Experimental Example 1, 7.0 Kg of phosphoric acid (50%) and 6.2 Kg of second agent subgroup B are placed into the transportable apparatus for mixing with the treated soil, separately arranging the phosphoric acid injection tube and the second agent subgroup B injection tube on the apparatus. The soil mortar is produced by strong mixing in the apparatus (optimum moisture content 18%).

The treated agents (first agent and second agent) are placed into the mixing apparatus from their respective storage tanks, each arranged with separate injection tubes. Through this design the gel reaction time is safely controlled by timely injection and reaction when the soil mortar is made. From about 20 minutes after mixing, stabilization for colloid and gel reaction starts. At this time the soil is compacted 50 times with a D-2 spring damper; and afterwards compacted and pressed 4 times by a half ton grader and a 2 ton roller. The resulting soil shows the following compressed broken strengths over time:

3 days 28 Kg/cm$^2$ 7 days 34.7 Kg/cm$^2$ 28 days 78.2 Kg/cm$^2$

Experimental Example 2

Polyacrylic acid and polyacrylamide are mixed in a ratio by weight of 10:1.5 in water to form a 3.5 wt % aqueous solution. Sand (particle size 0.2 to 1 mm) containing 2.0 wt % second agent subgroup B (comprising sodium fluosilicate, ferric chloride and lignin sodium sulfonate in a ratio by weight of 1.2:2.5:2.0) is filled in a square glass container having the dimensions of an inner diameter of 35 mm and a height of 400 mm. The test sand is filled up to a height of 350 mm. In the container, 100 ml of said copolymer (aqueous solution conc. 3.5 wt %) is poured and left to penetrate for 1 hour. Then water is added to the surface so as to view a free standing layer of water on the sand surface.

After one hour, the amount of water passing through the sand layer within the container is measured by a conventional method. No water was found to pass through the treated sand. Meanwhile, for sand without the above treatment the flow rate of water passing though this untreated sand was measured to be 18 ml/min.

Experimental Example 3

A copolymer composed of 6 moles of a acrylic acid and 4 moles of vinyl acetate, designated as Sample A, and copolymer composed of 10 moles of acrylic acid and 1.5 moles of acrylamide, designated as Sample B, are separately prepared. A 4.0 wt % aqueous solution of emulsion of each of the copolymers, Sample A and Sample B is prepared. Using the same testing methods as in the Experimental Example 2, the above solutions are applied to the sample sand to measure the flow rate of water passing through the sample. The results of measurements are as follows: the Sample A—copolymer had 2 ml/min flow rate and the Sample B—copolymer had 0 (zero, or no penetration).

Experimental Example 4

Polyacrylic acid, polyvinyl acetate, and polyacrylamide are mixed in a ratio by weight of 5:4:1 to prepare an emulsion of 3.5 wt % concentration.

The emulsion is used to treat the sample sand as in the Experimental Example 2 and the amount of water passing through is measured. No water was found to pass through. In the Experimental Examples 2, 3 and 4 water-proofing effects of the first agent are summarized in the table 2 below.

TABLE 2

| Constituent experimental example | Polyacrylic acid | Polyvinyl acetate | Polyacrylamide | Ratio by wt. | Effect for water-proofing (%) |
|---|---|---|---|---|---|
| 2 | 0 | | | 10:1.5 | 99 |
| 3 (A) | see note | | | 6:4 | 98 |
| 3 (B) | see note | | | 10:1.5 | 99 |
| 4 | 0 | 0 | 0 | 5:4:1 | 100 |

Note
0 - Major constituent used according to the experimental example
3(A) - Copolymer Sample A used in Experimental Example 3
3(B) - Copolymer Sample B used in Experimental Example 3

Above listed polymers have used in the experimental examples.

Experimental Example 5

As shown in Table 3 below, the second agent and various individual and mixtures of aqueous organic polymers as a first agent are tested as in the Experimental Example 2, varying the concentration wt % of second agent and the ratio by weight of the organic polymers.

The results of the present example are summarized in Table 3. The present Example 5 summarizes the results of the above Experimental Examples 2, 3 and 4 and arrives at the optimum compound ratio for the first agent and the second agent as shown in Table 3.

The aqueous phenol resin and magnesium stearate is used as part of the first agent. When the present invention is applied on jobsites in high temperature zones with high levels of ground heat and reflecting heat, a small amount of aqueous phenol resin and magnesium stearate improves the physical properties. As shown in Table 2, it is possible to entirely eliminate the usage of aqueous phenol resin and magnesium stearate and still get desirable results; however, when they are applied on jobsites in a warm zone, the addition of heat through mechanical means to the soil sub-base can improve the physical properties of the soil.

TABLE 3

| | Second agent | | | | | | |
|---|---|---|---|---|---|---|---|
| | Phosphoric acid (wt %) | Subgroup B (wt %) | | | | First agent | Ratio |
| No. | 3.5 | 0.1 | 1.0 | 3.5 | 5.0 | Organic polymer | by weight |
| 1 | | X | X | X | X | polyvinyl acetate | — |
| 2 | | X | X | X | X | polyacrylamide | — |
| 3 | | X | X | X | [ ] | polyacrylic acid | — |
| 4 | 0 | [ ] | 0 | 0 | 00 | polyacrylic acid/ polyacrylamide | 3:1 |
| 5 | 0 | 0 | 0 | 00 | 00 | polyacrylic acid/ polyacrylamide | 5:1 |
| 6 | 00 | 0 | 00 | 00 | 00 | polyacrylic acid/ polyacrylamide | 10:1 |
| 7 | 0 | 0 | 0 | 00 | 00 | polyacrylic acid/ polyvinyl acetate/ | 1:1 |
| 8 | 00 | 0 | 00 | 00 | 00 | polyacrylic acid/ polyvinyl acetate/ polyacrylamide | 5:4:1 |
| 9 | 00 | 00 | 00 | 00 | 00 | polyacrylic acid/ polyvinyl acetate/ polyacrylamide/ magnesium stearate/ water soluble phenol resin | 4.5:3.6: 0.9:0.3: 0.7 |

Remarks:
X - completely soluble  poor
[ ] - a little soluble  unsatisfactory
0 - unbalanced distribution  good
00 - balanced distribution (saturation)  excellent In the above Table 3, second agent is prepared by mixing in a ratio by weight of 1.2:2.5:2.0, sodium fluosilicate, ferric chloride and lignin sodium sulfonate, and they are indicated by 0.1, 1.0, 3.5 and 5.0 wt %, respectively, when they are treated with the first agent.

As for the first agent, polyacrylic acid/polyvinyl acetate/polyacrylamide/magnesium stearate/water soluble phenol resin in proportions of 4.5:3.6:0.9:0.3:0.7 as a ratio by weight are found to be the most effective in the treatment of soil. When applied on the transportable removable apparatus for mixing, the phosphoric acid injection tube, the second agent subgroup B injection tube, and the first agent injection tube are mounted on the storage tank thereof respectively and first agent and the second agent are injected into the removable apparatus for mixing through the above three injection tubes to prepare the desired soil mortars.

Example 2

The first agent and second agent formulation is based on sample No. 8 of Table 3 of Experimental Example 5. Soil samples are taken from a road (Ye euido, Seoul, Korea). The soil samples have a maximum density of 100.4 Pcf (1764 Kg/m$^2$), a natural moisture content of 11.6%, an optimum moisture content of 17% and passed 95% through No. 4 sieve. The soil samples ranged from reddish yellow silt to coarse sand clay.

The road is dugout up to 15 cm (6 inches) in depth thereof, and then the dugout soil is stirred in a rex stabilizer to a fine and uniform consistency. At this time, the soil is treated with the first agent and second agent in various mixing concentrations as shown in Table 4 by the conventional method described in this invention. The individual test samples are mixed within the transportable removable apparatus for mixing, controlling the amounts of fluid passed through the first agent injection tube, the phosphoric acid injection tube and the second agent subgroup B injection tube.

Next, the soil mortars treated with the first agent and the second agent according to the invention is poured and graded on the desired road, and finished through compaction with the vibration roller.

In order to confirm the solidification of such a treated road, test soil core samples from the treated road were taken every 7 days to carry out the strength test. The resulting strengths shown ranged from 42.9 Kg/cm$^2$ of strength and up. After 5 days from starting work, vehicles could normally pass through the road.

TABLE 4

| No. | Mixing amount of first agent and second agent based on the soil sample (wt %) | Soil Sample (Kg) | Optimum Moisture Content (O.M.C.) (%) | Natural Moisture Content (N.M.C.) (%) | Dryness (Pcf) | Time (Days) | Testing Strength (Kg/cm$^2$) |
|---|---|---|---|---|---|---|---|
| 1 | 6.7 | 3 | 16.4 | 11.2 | 110.4 | 8 | 42.9 |
| 2 | 9.0 | 3 | 17.3 | 10.8 | 110.3 | 8 | 58.1 |
| 3 | 11.0 | 3 | 18.2 | 11.4 | 110.2 | 8 | 67.3 |

The above Table 4 shows the results of the various mixing ratios for making the soil mortar when the subbase of the road is finished, classifying the mixing ratio by weight for the first agent and second agent into 6.7% (general strength), 9.0% (middle strength) and 11.0% (high strength).

Example 3

Soil samples from Example 2 are treated according to the present invention, and the resulting soil mortar is poured into a conventional batcher plant silo. Different amounts of phosphoric acid and second agent subgroup B are used to make sample compounds by mixing the appropriate amounts of the phosphoric acid and second agent subgroup B by controlling the fluid flow through the separate injection tubes. The hardening times for the prepared soil mortar are then measured.

The results on the gel time for the various compounds made of different combinations of amounts of Phosphoric acid and second agent subgroup B are summarized below in Table 5.

TABLE 5

| Compound No. | Phosphoric acid (CC) | Sodium fluosilicate (CC) | Lignin sodium sulfonate (CC) | Ferric chloride (CC) | Ph | Gel time |
|---|---|---|---|---|---|---|
| 1 | 50 | 5 | 5 | 7 | 9.6 | 240 min |
| 2 | 50 | 7 | 10 | 14 | 9.3 | 120 min |
| 3 | 50 | 10 | 15 | 20 | 9.0 | 90 min |
| 4 | 50 |  | 3 |  | 8.7 | 16 hours |
| 5 | 50 |  | 7 |  | 9.0 | 10 hours |
| 6 | 50 |  | 13 |  | 9.2 | 8 hours |
| 7 | 50 |  |  | 5 | 8.2 | 35 hours |
| 8 | 50 |  |  | 10 | 9.1 | 30 hours |
| 9 | 50 |  |  | 20 | 9.0 | 25 hours |
| 10 | 50 | 4 |  | 3 | 8.7 | 360 min |
| 11 | 50 | 8 |  | 8 | 9.0 | 24 hours |
| 12 | 50 | 12 |  | 15 | 9.4 | 120 min |

The above Example 3 demonstrates using the jobsite soil samples from Example 2 how the gel time can be effectively controlled by varying the composition of chemical additives in the preparation of the soil hardening mortar. The present invention permits one to control the timing of the work in progress to give ample time for the site work to be finished within 60 minutes, and to start the gel reaction within a range of 60 to 120 minutes.

As described in the Experimental Examples and Examples above, the present invention can be applied on all types of soils on the jobsite, and is economical with the advantage of short working times. In addition it has uniform curing by chemical reaction, waterproofing, excellent compressed broken strength for stabilization and resistance to cracking by compression.

Further, the present invention can be applied to difficult to treat soils including silt, clay and organic soil, to produce uniformly balanced soil mortar, and in particular, it is uniquely suited for solving the difficult solidification of clay.

What is claimed is:

1. A method of making a soil hardening mortar comprising:
   reducing to between 10% and 12% the natural moisture content of the soil,
   grinding said soil to within a particle size of 5 to 15 mm,
   mixing said soil with a first agent and a second agent applied in a ratio of 1:1 by weight until said agents are uniformly infiltrated in said soil with said soil particles thoroughly infiltrated to have an optimum moisture content of 15% to 18%,
   wherein said first agent comprises a polymer or mixture of polymers or copolymers, said polymers or mixture of polymers or copolymers containing polymerized monomer or monomers of acrylic acid and/or vinyl acetate and/or acrylamide, and said second agent comprises of sodium fluosilicate and ferric chloride.

2. The method of claim 1, wherein said polymer or mixture of polymers is a mixture composed of polyacrylic acid and polyvinyl acetate, and the ratio of polyacrylic acid to polyvinyl acetate is 1:1 by weight.

3. The method of claim 1, wherein said polymer or mixture of polymers is a mixture composed of polyacrylic acid and polyvinyl acetate, and the ratio of polyacrylic acid and polyvinyl acetate is 4.5:3.6 by weight.

4. The method of claim 1, wherein said first agent comprises a polymer or mixture of polymers mixed with magnesium stearate and water soluble phenolic resin, said polymer or mixture of polymers containing polymerized monomer or monomers of acrylic acid or vinyl acetate.

5. The method of claim 4, wherein said polymer or mixture of polymers is a mixture composed of polyacrylic acid and polyvinyl acetate mixed with magnesium stearate and water soluble phenolic resin, and the ratio of polyacrylic acid to polyvinyl acetate to magnesium stearate to water soluble phenolic resin is 4.5:3.6:0.3:0.7 by weight, said water soluble phenolic resin has a moisture content of 30% to 50% and a PH of 8 to 10.

6. The method of claim 1, wherein said polymer or mixture of polymers is a mixture composed of polyacrylic acid, polyvinyl acetate and polyacrylamide, and the ratio of polyacrylic acid to polyvinyl acetate to polyacrylamide is 5:4:1 by weight.

7. The method of claim 1, wherein said polymer or mixture of polymers is a mixture composed of polyacrylic acid, polyvinyl acetate and polyacrylamide, and the ratio of polyacrylic acid to polyvinyl acetate to polyacrylamide is 4.5:3.6:0.9 by weight.

8. The method of claim 6, wherein said first agent comprises a polymer or mixture of polymers mixed with magnesium stearate and water soluble phenolic resin, said polymer or mixture of polymers containing polymerized monomer or monomers of acrylic acid or vinyl acetate or acrylamide.

9. The method of claim 8, wherein said polymer or mixture of polymers is a mixture composed of polyacrylic acid, polyvinyl acetate, and polyacrylamide, further mixed with magnesium stearate and water soluble phenolic resin, and the ratio of polyacrylic acid to polyvinyl acetate to polyacrylamide to magnesium stearate to water soluble phenolic resin is 4.5:3.6:0.9:0.3:0.7 by weight, said water soluble phenolic resin has a moisture content of 30% to 50% and a PH of 8 to 10.

10. The method of claim 1, wherein said first agent comprises a polymer or mixture of polymers, said polymer or mixture of polymers containing polymerized monomer or monomers of acrylic acid or acrylamide.

11. The method of claim 10, wherein said polymer or mixture of polymers is a mixture composed of polyacrylic acid and polyacrylamide, and the ratio of polyacrylic acid and polyacrylamide is 10:1.5 by weight.

12. The method of claim 10, wherein said first agent comprises a polymer or mixture of polymers mixed with magnesium stearate and water soluble phenolic resin, said polymer or polymers containing polymerized monomer or monomers of acrylic acid or acrylamide.

13. The method of claim 12, wherein said polymer or mixture of polymers is a mixture composed of polyacrylic acid and polyacrylamide mixed with magnesium stearate and water soluble phenolic resin, and the ratio of polyacrylic acid to polyacrylamide to magnesium stearate to water soluble phenolic resin is 4.5:0.9:0.3:0.7 by weight.

14. The method of claim 10, wherein said polymer or mixture of polymers of copolymers is a copolymer of acrylic acid with acrylamide, and the ratio of acrylic acid to acrylamide is 10:1.5 by weight.

15. The method of claim 14, wherein said first agent comprises a polymer or mixture of polymers or copolymers mixed with magnesium stearate and water soluble phenolic resin, said polymer or mixture of polymers or copolymers containing polymerized monomer or monomers of acrylic acid and acrylamide.

16. The method of claim 15, wherein said polymer or mixture of polymers or copolymers is a copolymer of acrylic acid with acrylamide mixed with magnesium stearate and water soluble phenolic resin, and the ratio of copolymer of acrylic acid with acrylamide to magnesium stearate to water soluble phenolic resin is 5.4:0.3:0.7 by weight.

17. The method of claim 1, wherein said polymer or mixture of polymers or copolymers is a copolymer of acrylic acid with vinyl acetate, and the ratio of acrylic acid to vinyl acetate is 6:4 by weight.

18. The method of claim 17, wherein said first agent comprises a polymer or mixture of polymers or copolymers mixed with magnesium stearate and water soluble phenolic resin.

19. The method of claim 18, wherein said polymer or mixture of polymers or copolymers is a copolymer of acrylic acid with vinyl acetate mixed with polyacrylamide, and further mixed with magnesium stearate and water soluble phenolic resin; the ratio of copolymer of acrylic acid with vinyl acetate to polyacrylamide to magnesium stearate to water soluble phenolic resin is 8.1:0.9:0.3:0.7 by weight, said water soluble phenolic resin has a moisture content of 30% to 50% and a PH of 8 to 10.

20. The method of claim 1, wherein the ratio of sodium fluosilicate and ferric chloride is 1.2:2.5 by weight.

21. The method of claim 1, wherein said second agent is composed of sodium fluosilicate, ferric chloride and lignin sodium sulfonate.

22. The method of claim 21, wherein the ratio of sodium fluosilicate, ferric chloride and lignin sodium sulfonate is 1.2:2.5:2.0 by weight.

23. The method of claim 1, wherein said second agent is composed of sodium fluosilicate, ferric chloride, lignin sodium sulfonate and phosphoric acid.

24. The method of claim 23, wherein the ratio of sodium fluosilicate, ferric chloride, lignin sodium sulfonate and phosphoric acid is 1.2:2.5:2.0:4.3 by weight.

25. A soil hardening agent comprising:
said agent composed of a first agent and a second agent present in a ratio of 1:1 by weight,
wherein said first agent comprises a polymer or mixture of polymers or copolymers, said polymers or mixture of polymers or copolymers containing polymerized monomer or monomers of acrylic acid and/or vinyl acetate and/or acrylamide,
and said second agent comprises of sodium fluosilicate and ferric chloride.

26. The soil hardening agent as set forth in claim 25, wherein said polymer or mixture of polymers is a mixture composed of polyacrylic acid and polyvinyl acetate, and the ratio of polyacrylic acid to polyvinyl acetate is 1:1 by weight.

27. The soil hardening agent as set forth in claim 25, wherein said polymer or mixture of polymers is a mixture composed of polyacrylic acid and polyvinyl acetate, and the ratio of polyacrylic acid and polyvinyl acetate is 4.5:3.6 by weight.

28. The soil hardening agent as set forth in claim 25, wherein said first agent comprises a polymer or mixture of polymers mixed with magnesium stearate and water soluble phenolic resin, said polymer or mixture of polymers containing polymerized monomer or monomers of acrylic acid or vinyl acetate.

29. The soil hardening agent as set forth in claim 28, wherein said polymer or mixture of polymers is a mixture composed of polyacrylic acid and polyvinyl acetate mixed with magnesium stearate and water soluble phenolic resin, and the ratio of polyacrylic acid to polyvinyl acetate to magnesium stearate to water soluble phenolic resin is 4.5:3.6:0.3:0.7 by weight, said water soluble phenolic resin has a moisture content of 30% to 50% and a PH of 8 to 10.

30. The soil hardening agent as set forth in claim 25, wherein said polymer or mixture of polymers is a mixture composed of polyacrylic acid, polyvinyl acetate and polyacrylamide, and the ratio of polyacrylic acid to polyvinyl acetate to polyacrylamide is 5:4:1 by weight.

31. The soil hardening agent as set forth in claim 25, wherein said polymer or mixture of polymers is a mixture composed of polyacrylic acid, polyvinyl acetate and polyacrylamide, and the ratio of polyacrylic acid to polyvinyl acetate to polyacrylamide is 4.5:3.6:0.9 by weight.

32. The soil hardening agent as set forth in claim 30, wherein said first agent comprises a polymer or mixture of polymers mixed with magnesium stearate and water soluble phenolic resin, said polymer or mixture of polymers containing polymerized monomer or monomers of acrylic acid or vinyl acetate or acrylamide.

33. The soil hardening agent as set forth in claim 32, wherein said polymer or mixture composed of polymers is a mixture of polyacrylic acid, polyvinyl acetate, and polyacrylamide, further mixed with magnesium stearate and water soluble phenolic resin, and the ratio of polyacrylic acid to polyvinyl acetate to polyacrylamide to magnesium stearate to water soluble phenolic resin is 4.5:3.6:0.9:0.3:0.7 by weight, said water soluble phenolic resin has a moisture content of 30% to 50% and a PH of 8 to 10.

34. The soil hardening agent as set forth in claim 1, wherein said first agent comprises a polymer or mixture of polymers, said polymer or mixture of polymers containing polymerized monomer or monomers of acrylic acid or acrylamide.

35. The soil hardening agent as set forth in claim 34, wherein said polymer or mixture of polymers is a mixture composed of polyacrylic acid and polyacrylamide, and the ratio of polyacrylic acid and polyacrylamide is 10:1.5 by weight.

36. The soil hardening agent as set forth in claim 34, wherein said first agent comprises a polymer or mixture of polymers mixed with magnesium stearate and water soluble phenolic resin, said polymer or polymers containing polymerized monomer or monomers of acrylic acid or acrylamide.

37. The soil hardening agent as set forth in claim 36, wherein said polymer or mixture of polymers is a mixture composed of polyacrylic acid and polyacrylamide mixed with magnesium stearate and water soluble phenolic resin, and the ratio of polyacrylic acid to polyacrylamide to magnesium stearate to water soluble phenolic resin is 4.5:0.9:0.3:0.7 by weight.

38. The soil hardening agent as set forth in claim 34, wherein said polymer or mixture of polymers or copolymers is a copolymer of acrylic acid with acrylamide, and the ratio of acrylic acid to acrylamide is 10:1.5 by weight.

39. The soil hardening agent as set forth in claim 38, wherein said first agent comprises a polymer or mixture of polymers or copolymers mixed with magnesium stearate and water soluble phenolic resin, said polymer or mixture of polymers or copolymers containing polymerized monomer or monomers of acrylic acid and acrylamide.

40. The soil hardening agent as set forth in claim 39, wherein said polymer or mixture of polymers or copolymers is a copolymer of acrylic acid with acrylamide mixed with magnesium stearate and water soluble phenolic resin, and the ratio of copolymer of acrylic acid with acrylamide to magnesium stearate to water soluble phenolic resin is 5.4:0.3:0.7 by weight.

41. The soil hardening agent as set forth in claim 25, wherein said polymer or mixture of polymers or copolymers is a copolymer of acrylic acid with vinyl acetate, and the ratio of acrylic acid to vinyl acetate is 6:4 by weight.

42. The soil hardening agent as set forth in claim 41, wherein said first agent comprises a polymer or mixture of polymers or copolymers mixed with magnesium stearate and water soluble phenolic resin.

43. The soil hardening agent as set forth in claim 42, wherein said polymer or mixture of polymers or copolymers is a copolymer of acrylic acid with vinyl acetate mixed with polyacrylamide, and further mixed with magnesium stearate and water soluble phenolic resin; the ratio of copolymer of acrylic acid with vinyl acetate to polyacrylamide to magnesium stearate to water soluble phenolic resin is 8.1:0.9:0.3:0.7 by weight, said water soluble phenolic resin has a moisture content of 30% to 50% and a PH of 8 to 10.

44. The soil hardening agent as set forth in claim 25, wherein the ratio of sodium fluosilicate and ferric chloride is 1.2:2.5 by weight.

45. The soil hardening agent as set forth in claim 25, wherein said second agent is composed of sodium fluosilicate, ferric chloride and lignin sodium sulfonate.

46. The soil hardening agent as set forth in claim 45, wherein the ratio of sodium fluosilicate, ferric chloride and lignin sodium sulfonate is 1.2:2.5:2.0 by weight.

47. The soil hardening agent as set forth in claim 25, wherein said second agent is composed of sodium fluosilicate, ferric chloride, lignin sodium sulfonate and phosphoric acid.

48. The soil hardening agent as set forth in claim 47, wherein the ratio of sodium fluosilicate, ferric chloride, lignin sodium sulfonate and phosphoric acid is 1.2:2.5:2.0:4.3 by weight.

49. A soil hardening mortar comprising:
said mortar containing between 10% and 18% moisture content composed of the soil, a first agent and a second agent, said first agent and said second agent present in a ratio of 1:1 by weight,
wherein said first agent comprises a polymer or mixture of polymers or copolymers, said polymers or mixture of polymers or copolymers containing polymerized monomer or monomers of acrylic acid and/or vinyl acetate and/or acrylamide, and said second agent comprises of sodium fluosilicate and ferric chloride.

50. The soil hardening mortar as set forth in claim 49, wherein said polymer or mixture of polymers is a mixture composed of polyacrylic acid and polyvinyl acetate, and the ratio of polyacrylic acid to polyvinyl acetate is 1:1 by weight.

51. The soil hardening mortar as set forth in claim 49, wherein said polymer or mixture of polymers is a mixture composed of polyacrylic acid and polyvinyl acetate, and the ratio of polyacrylic acid and polyvinyl acetate is 4.5:3.6 by weight.

52. The soil hardening mortar as set forth in claim 49, wherein said first agent comprises a polymer or mixture of polymers mixed with magnesium stearate and water soluble phenolic resin, said polymer or mixture of polymers containing polymerized monomer or monomers of acrylic acid or vinyl acetate.

53. The soil hardening mortar as set forth in claim 52, wherein said polymer or mixture of polymers is a mixture composed of polyacrylic acid and polyvinyl acetate mixed with magnesium stearate and water soluble phenolic resin, and the ratio of polyacrylic acid to polyvinyl acetate to magnesium stearate to water soluble phenolic resin is 4.5:3.6:0.3:0.7 by weight, said water soluble phenolic resin has a moisture content of 30% to 50% and a PH of 8 to 10.

54. The soil hardening mortar as set forth in claim 49, wherein said polymer or mixture of polymers is a mixture composed of polyacrylic acid, polyvinyl acetate and polyacrylamide, and the ratio of polyacrylic acid to polyvinyl acetate to polyacrylamide is 5:4:1 by weight.

55. The soil hardening mortar as set forth in claim 49, wherein said polymer or mixture of polymers is a mixture composed of polyacrylic acid, polyvinyl acetate and polyacrylamide, and the ratio of polyacrylic acid to polyvinyl acetate to polyacrylamide is 4.5:3.6:0.9 by weight.

56. The soil hardening mortar as set forth in claim 54, wherein said first agent comprises a polymer or mixture of polymers mixed with magnesium stearate and water soluble phenolic resin, said polymer or mixture of polymers containing polymerized monomer or monomers of acrylic acid or vinyl acetate or acrylamide.

57. The soil hardening mortar as set forth in claim 56, wherein said polymer or mixture composed of polymers is a mixture of polyacrylic acid, polyvinyl acetate, and polyacrylamide, further mixed with magnesium stearate and water soluble phenolic resin, and the ratio of polyacrylic acid to polyvinyl acetate to polyacrylamide to magnesium stearate to water soluble phenolic resin is 4.5:3.6:0.9:0.3:0.7 by weight, said water soluble phenolic resin has a moisture content of 30% to 50% and a PH of 8 to 10.

58. The soil hardening mortar as set forth in claim 49, wherein said first agent comprises a polymer or mixture of polymers, said polymer or mixture of polymers containing polymerized monomer or monomers of acrylic acid or acrylamide.

59. The soil hardening mortar as set forth in claim 58, wherein said polymer or mixture of polymers is a mixture composed of polyacrylic acid and polyacrylamide, and the ratio of polyacrylic acid and polyacrylamide is 10:1.5 by weight.

60. The soil hardening mortar as set forth in claim 58, wherein said first agent comprises a polymer or mixture of polymers mixed with magnesium stearate and water soluble phenolic resin, said polymer or polymers containing polymerized monomer or monomers of acrylic acid or acrylamide.

61. The soil hardening mortar as set forth in claim 60, wherein said polymer or mixture of polymers is a mixture composed of polyacrylic acid and polyacrylamide mixed with magnesium stearate and water soluble phenolic resin, and the ratio of polyacrylic acid to polyacrylamide to magnesium stearate to water soluble phenolic resin is 4.5:0.9:0.3:0.7 by weight.

62. The soil hardening mortar as set forth in claim 58, wherein said polymer or mixture of polymers or copolymers is a copolymer of acrylic acid with acrylamide, and the ratio of acrylic acid to acrylamide is 10:1.5 by weight.

63. The soil hardening mortar as set forth in claim 62, wherein said first agent comprises a polymer or mixture of polymers or copolymers mixed with magnesium stearate and water soluble phenolic resin, said polymer or mixture of polymers or copolymers containing polymerized monomer or monomers of acrylic acid and acrylamide.

64. The soil hardening mortar as set forth in claim 63, wherein said polymer or mixture of polymers or copolymers is a copolymer of acrylic acid with acrylamide mixed with magnesium stearate and water soluble phenolic resin, and the ratio of copolymer of acrylic acid with acrylamide to magnesium stearate to water soluble phenolic resin is 5.4:0.3:0.7 by weight.

65. The soil hardening mortar as set forth in claim 49, wherein said polymer or mixture of polymers or copolymers is a copolymer of acrylic acid with vinyl acetate, and the ratio of acrylic acid to vinyl acetate is 6:4 by weight.

66. The soil hardening mortar as set forth in claim 65, wherein said first agent comprises a polymer or mixture of polymers or copolymers mixed with magnesium stearate and water soluble phenolic resin.

67. The soil hardening mortar as set forth in claim 66, wherein said polymer or mixture of polymers or copolymers is a copolymer of acrylic acid with vinyl acetate mixed with polyacrylamide, and further mixed with magnesium stearate and water soluble phenolic resin; the ratio of copolymer of acrylic acid with vinyl acetate to polyacrylamide to magnesium stearate to water soluble phenolic resin is 8.1:0.9:0.3:0.7 by weight, said water soluble phenolic resin has a moisture content of 30% to 50% and a PH of 8 to 10.

68. The soil hardening mortar as set forth in claim 49, wherein the ratio of sodium fluosilicate and ferric chloride is 1.2:2.5 by weight.

69. The soil hardening mortar as set forth in claim 49, wherein said second agent is composed of sodium fluosilicate, ferric chloride and lignin sodium sulfonate.

70. The soil hardening mortar as set forth in claim 69, wherein the ratio of sodium fluosilicate, ferric chloride and lignin sodium sulfonate is 1.2:2.5:2.0 by weight.

71. The soil hardening mortar as set forth in claim 49, wherein said second agent is composed of sodium fluosilicate, ferric chloride, lignin sodium sulfonate and phosphoric acid.

72. The soil hardening mortar as set forth in claim 71, wherein the ratio of sodium fluosilicate, ferric chloride, lignin sodium sulfonate and phosphoric acid is 1.2:2.5:2.0:4.3 by weight.

* * * * *